United States Patent Office 3,634,575
Patented Jan. 11, 1972

3,634,575
MELT EXTRUSION OF ACRYLONITRILE
POLYMERS
George Allibone Serad, Edison, N.J., assignor to
Celanese Corporation, New York, N.Y.
No Drawing. Filed Oct. 2, 1968, Ser. No. 764,615
Int. Cl. B28b 3/20
U.S. Cl. 264—176 F
3 Claims

ABSTRACT OF THE DISCLOSURE

High polyacrylonitrile polymers containing at least 85 percent acrylonitrile can be melt extruded into useful shaped articles when plasticized with a plasticizing system comprising a low boiling acetonitrile fraction and a high boiling fraction capable of plasticizing the polyacrylonitrile at extrusion temperatures.

The present invention relates to acrylonitrile polymer compositions and a method for melt extruding polyacrylonitrile compositions. More particularly, the invention relates to plasticized polyacrylonitrile melts containing acrylonitrile polymers of at least 85% acrylonitrile content and a plasticizing system comprising a particular combination of solvents enabling melt phase extrusion of high acrylonitrile polymers through conventional film and filament extruders at temperatures at which reasonable extrusion rates and adequate draw-down ratios are obtainable without causing polymer degradation. The polymeric shaped articles, particularly films and fibers, prepared according to the present invention do not require post-extrusion washing for solvent removal, are free of discoloration and undesired void formation and can be melt phase attenuated and fibrillated where desired into useful textile materials.

Polyacrylonitrile polymers of high acrylonitrile content in which at least 85 perecnt by weight of the polymer is acrylonitrile have been known for some time. These polymers, possessing the necessary characteristics for producing shaped articles having excellent physical properties, have been dry and wet spun from solutions having a polymer concentration up to about 25 to 40 percent. Conventional spinning technology, and particularly dry spinning, has utilized relatively high boiling solvents (boiling above about 100 degrees centigrade) for forming spinnable dopes of high acrylonitrile polymers. The prime disadvantage inherent in such systems is the necessity of a time-consuming and costly post-extrusion washing step to remove adhered solvent from the filament.

The formation of shaped articles by a pure melt extrusion process, that is a process in which the polymer is extruded in the melt phase into an inert medium as opposed to dry and wet methods in which a solution of the polymer is being extruded, is exceedingly difficult with polyacrylonitrile polymers containing at least 85 percent acrylonitrile by weight because they cannot be melted as such without polymer decompostion.

It has been suggested in the prior are to plasticize polyacrylonitrile in order to obtain sufficient fluidity for melt extrusion with the high boiling solvents used in solution spinning methods. However, these systems have been unsuccesful commercially due to the poor physical properties of the extruded articles and the fact that such systems do no alleviate the problem of solvent removal. Specifically, melt extruded filaments have been weak, probably due to polymer degradation, with tenacities rendering them unsuitable for textile uses, have contained undesired voids and polymeric gel particles and have been discolored due to polymer degradation. The later defect is particularly pronounced when conventional high boiling solvent systems are employed for melt extrusion of acrylic films. The film emerges discolored and non-uniform because of polymer degradation occuring in the extruder at the high temperatures required to maintain sufficient fluidity of the polymer for melt extrusion and attenuation. Overall, the high boiling solvent melt extrusion process is of a discontinuous nature with poor yarn and filament uniformity.

Therefore, it is an object of the present invention to provide extrudable melt compositions of acrylonitrile polymers of at least 85 percent acrylonitrile content and a process for melt extrusion thereof through conventional film and filament extruders at high rates under continuous operations while maintaining sufficient polymer fluidity both throughout the extruder at temperatures below the degradation point of the polymer and also in the extrudate for adequate hot melt attentuation into transparent, and where desired, void-free filament and film products. It is another object of the present invention to provide high acrylonitrile melt compositions and a process for melt extrusion thereof which do not require costly and time-consuming post extrusion washing steps for solvent removal. It is still another object of the present invention to provide polyacrylonitrile feed compositions, particularly of high polyacrylonitrile content, which may be melt extruded and subsequently converted by continuous operations into yarn-like textile products by either foam and/or mechanical fibrillation techniques.

These and other objects of this invention will be obvious to those skilled in the art from the detailed description of the invention hereinafter.

THE INVENTION

In accordance with the present invention, there are provided homogeneous polyacrylonitrile compositions for melt extrusion containing at least 50 percent by weight high acrylonitrile polymer admixed with a plasticizing mixture comprising 40 to 70 percent by weight of a low boiling acetonitrile fraction and 60 to 30 percent by weight of a compatible high boiling liquid fraction capable of solely plasticizing high acrylonitrile polymers at extrusion temperatures following dissipation of the acetonitrile fraction. This plasticizing system enables continuous, high speed melt extrusion of high acrylonitrile polymers at a temperature above the gelling temperature but below the degradation temperature of the acrylonitrile polymer into continuous, uniform, undegraded filaments and films which retain suffiicent fluidity at extrusion temperature to be drawn down at least 105 percent, although usually at least 300 to 500 percent, during a take-up rate of at least 3 meters/minute. The relatively low boiling plasticizing component is selected from acetonitrile and acetonitrile-water mixtures containing up to about 35 percent water while the high boiling compatible plasticizer is selected from compounds and mixtures of two or more compounds enabling continuous extrusion of coherent, undegraded high polyacrylonitrile film and filaments, following volatilization of the low boiler in the extruder, at an extrusion temperature between about 75 to 200 degrees centigrade under applied operating pressures of about 50 to 15,000 p.s.i.g., and through a shaped orifice having a minimum cross-sectional area of about .005 sq. in. (50 micron diameter spinnerettes for filament extrusion) with a through-put rate of at least 2 grams/minute for films .05 gram/minute/hole for filament extrusion, said extrudate having an immediate inherent post-extruder apparent melt viscosity of about $10^4$ to $10^6$ poise, corresponding to a pre-die viscosity of about $10^3$ to $10^5$ poise, permitting a draw down of at least 105 percent, usually 300 to 500 percent into a shaped article possessing a tensile strength of at least 0.3 gram per denier.

The employment of the above-disclosed solvent system for melt extrusion of polyacrylonitrile films and filaments results in advantages not found in prior art methods. The hot melt may be extruded through conventional screw extruders terminating in circular or flat film dies or spinnerettes without polymer degradation or discoloration of the extrudate. The extrudate may be attenuated and oriented to prepare filaments and films of acrylonitrile polymers, the films possessing the inherent characteristics and properties required for fibrillation. The fibrillated yarns obtained may be employed in various end-use application, for example as carpet yarns. The filaments obtained may also be employed in vairous end-use applications, for example, to prepare knitted and woven textile products.

During extrusion and attenuation, the organic solvents spontaneously evaporate, thus eliminating washing steps. By a judicious selection of plasticizing solvents and regulation of the temperature of extrusion, a foamed film may be prepared containing a plurality of voids facilitating the subsequent mechanical fibrillation of the extrudate. These and numerous other advantages of the invention will become apparent to those skilled in the art from the further description of the invention which follows.

DETAILED DESCRIPTION

The present invention is directed to melt compositions of high acrylonitrile polymers containing at least 85 percent acrylonitrile homogeneously admixed with a low boiling plasticizer which, in combination with a compatible high boiling plasticizer, is capable of maintaining sufficient melt fluidity throughout the entire length of the extruder and, further, of plasticizing the extrudate to allow high speed drawing of the hot melt. During melt phase attenuation, the extrudate is capable of being drawn down at least 105 to 500 percent at a take-up of at least 3 meters/minute.

The compositions of the present invention may be melt extruded through conventional film dies and spinnerettes of various cross-sectional configurations. Spinnerettes capable of being used to practice the invention will have diameters of about 50–200 microns and may be circular, cruiform and the like. Film forming dies used for extrusion of the plasticized polyacrylonitrile melt will, of course, be of a larger cross-sectional area and may be circular or flat.

As referred to herein, polyacrylonitrile polymers of high acrylonitrile content contain at least 85% acrylonitrile. These high acrylonitrile polymers can be acrylonitrile homopolymers as well as copolymers of two or more monomers wherein up to about 15 percent of the polymer can be another ethylenically unsaturated compound copolymerizable with acrylonitrile. Such material can be monomers or polymers which are copolymerizable with the acrylonitrile and add to, modify and/or enhance certain characteristics of the acrylic polymer. Often the material copolymerizable with the acrylonitrile contains a chemical group which increases the basic dyeability of the resulting polymer. Such dye enhancing compounds normally contain a sulfur or phosphorous group in the ethylenically unsaturated chemical entity copolymerizable with the acrylonitrile. Typically, such sulfur or phosphorous-containing compounds are added in an amount of about 0.1 to about 5 percent by weight of the total polymer composition while the other modifying substance, if any, is used in an amount up to about 15 percent. Typical ethylenically unsaturated monomers copolymerized with acrylonitrile are methylacrylate, methallyl alcohol, vinylidene cyanide, styrene sulfonic acid materials, sodium methallyl sulfonate, mixtures and partial polymers thereof and the like well known to those skilled in the art. Similarly, acid dyeability may be imparted by use of nitrogen-containing comonomers such as allylamide. The polymers are polymerized by conventional methods well known in the art.

The polymers, for hot melt extrusion to prepare filaments and films capable of conversion into fibrillated yarn, are preferably polymerized to an inherent viscosity of about 1.4 to 1.6 and more preferably about 1.5 as measured in dimethyl formamide solvent at 0.1 percent concentration at 25 degrees centigrade. Of course, higher I.V.'s can be used but they result in high viscosities for a given solvent concentration and may result in a reduction in certain desirable properties, including fibrillation In most instances wherein the present compositions are most desirably used, feeds having an initial polymer solids concentration in the range of about 50 to 85 percent by wieght are preferred. In particular, extruder feeds of a solids content of about 55 to 60 percent enable the extrusion of polyacrylonitrile filaments and films, having superior physical properties, the films being fibrillatable.

The present solvent system, in contradistinction to the prior art solvent systems employed for solution spinning high polyacrylonitriles, should contain a relatively high boiling plasticizer in addition to a low boiling component. The plasticizing system plasticizes polyacrylonitrile polymers, including those of a high acrylonitrile content, sufficiently to enable hot melt extrusion through conventional screw extruders to form drawable polyacrylonitrile filaments and films.

As stated hereinbefore, acrylonitrile polymers cannot be melt extruded as such from conventional extruders because they are intractable and decompose rapidly at their melting temperature of about 200 degrees centigrade. As will appear more fully from commonly assigned applications S.N. 764,380 and S.N. 764,484 filed concurrently herewith and incorporated herein by reference, solutions of polyacrylonitrile polymers suitable for wet and dry spinning of acrylonitrile fibers and particularly high polyacrylonitrile polymers of at least 85 percent acrylonitrile content may be prepared using low boiling solvent systems (boiling below about 100 degrees centigrade) such as acetonitrile and acetonitrile-water mixtures at viscosities and solids content suitable for extrusion through spinnerettes with simultaneous evaporation of the solvent system.

As disclosed in said copending applications acetonitrile depresses the melting temperature of high acrylonitrile polymers forming a stable solution spinning dope therewith below the boiling point of the acetonitrile, that is, below about 100 degrees centigrade. However, the use of such low boiling solvents as plasticizers in the hot melt extrusion of high solids content acrylonitrile polymer compositions containing over 50 percent by weight high acrylic polymer through conventional film and filament forming dies causes extruder stoppage and issuance of a discontinuous, non-uniform extrudate. The acrylonitrile polymer slowly solidifies inside the die because of the rapid loss of low boiling plasticizer as the melt approaches the die exit. Obviously, time consumed in cleaning and restarting such a system is economically unfeasible.

As stated hereinbefore, if a high boiling solvent such as those previously used in the art in melt spinning of such acrylonitrile polymers, such as gamma-butyrolactone, dimethyl formamide and the cyclic carbonates, is employed as the sole plasticizer in the melt extrusion of high acrylonitrile polymers through conventional screw extruders, barrel temperatures at which acrylonitrile polymers decompose are often necessary. Additionally, polymeric gel particles begin to appear in the extruded films and filaments, limiting their applicability in fibrillation and other conversion processes.

From the above, it is readily apparent that although dry and wet solution spinning technology is not particularly useful for devising plasticizing systems possessing the necessary properties to render high acrylonitrile polymers sufficiently fluid during a true melt extrusion process at operating temperatures which will not result in polymer degradation while also maintaining the viscosity of the coherent extrudate sufficiently low for good hot melt attenuation, it would be highly desirous to be able to retain the advantages inherent in the low boiling dry and wet solvent systems in a true melt extrusion process, a further important object of the present invention.

The plasticizing solvent system of the present invention, in combining the low boiling acetonitrile with a high boiling plasticizer, permits continuous extrusion from conventional equipment under temperatures and pressures at which there is no polymer degradation to form, for example, polyacrylonitrile films which can be subsequently oriented and fibrillated into textile yarns.

The low boiling fraction of the plasticizing mixture is selected from acetonitrile and acetonitrile-water mixtures. The water aids in depressing the initial solution temperature of the polymer as well as lowering the gel temperature of the final solution. The boiling point of acetonitrile is about 82 degrees centigrade and the azeotrope of 15 percent water boils at about 76 degrees centigrade. However, it should be borne in mind that the terms "low boiling solvent," "acetonitrile solvent" and the like as used herein and in the appended claims include 100 percent acetonitrile as well as acetonitrile-water mixtures.

The low boiling component will generally comprise about 40 to 70 weight percent of the total plasticizing system and will contain up to about 35 weight percent and preferably about 10 to 20 weight percent water, the balance being acetonitrile.

The high boiling component is selected from compounds which plasticize the particular acrylonitrile polymer at extrusion temperatures as well as in the extruder during and after volatilization of the low boiler. Preferably, the high boiler will have a boiling point of about the temperature in the die end of the extruder or, correspondingly, the film will be extruded at about the vaporization temperature of the high boiling component. A judicious selection of process conditions and especially extrusion temperatures in film extrusion will thus permit where desired the production of a foamed extrudate containing a plurality of minute air spaces, the high boiling plasticizer functioning as a blowing agent in addition to its plasticizing and solvating functions. In this aspect of the invention, which may be considered as a preferred embodiment, the foaming extrudate will quickly and readily fibrillate as is more fully described in commonly assigned Application S.N. 578,560, filed by Herbert A. Keuchel on Sept. 10, 1966 and now abandoned, incorporated herein by reference. If not fibrillated as extruded, the material may be fibrillated following an initial drawing and orientation process by mechanical means known in the art, the extrudate containing numerous air spaces which will be accentuated during stretching and mechanical working resulting in fibril formation. In either case, the fibrillated product, as more fully described in said copending application, is characterized by the substantial absence of trapezoidal fibril cross-sections. Instead, the fibrils, of the present invention are characterized by a rounded profile with the substantial absence of flat or planar surfaces. Thus the term "high boiling solvent component" and the like as used herein and in the appended claims refers to compounds and mixtures of two or more compounds compatible with the low boiling solvent component and possessing the requisite physical and chemical properties to act as a post-extruder plasticizer for the particular acrylonitrile polymer as described hereinafter, as well as a plasticizer during its passage through the hottest parts of the extruder and die following substantially complete dissipation of the low boiling plasticizer from the melt.

Considering the high boiler in greater detail, a determination of specific extrudate properties required under minimum operating conditions of temperature, pressure, running speed and die cross-sectional area for the extrusion of an undegraded, coherent, uniform continuous extrudate free of undesired void and gel formation and having a minimum distensibility and tensile strength allows the selection of a compatible high boiling plasticizer. As the extrudate emerges from the die head, the polyacrylonitrile would solidify into a brittle intractable mass in the absence of the high boiler. It has been found that when the immediate post-extruder apparent melt viscosity is about $10^4$ to $10^6$ poise, or preferably $10^5$ poise, the extrudate can be subjected to a hot draw down of at least 105 to 500 percent without causing any significant amount of polymer orientation. Therefore, the high boiler supplies sufficient distensibility and flexibility to the high acrylonitrile polymer at an extrusion temperature in the range of about 75 to 200 degrees centigrade, under operating pressures in the range of about 50 to 15,000 p.s.i.g. with a throughput rate of at least 2 grams/minute, and through a shaped orifice having a minimum cross-sectional area of .005 square inch to form an extrudate having an immediate inherent post-extruder apparent melt viscosity of about $10^4$ to $10^6$ which can be drawn at least 105 to 500 percent into a coherent, unoriented article at a take-up speed of at least 3 meters/minute possessing a tensile strength of at least 3 grams per denier.

In the preferred embodiments of the invention the high boiling plasticizer is selected from compounds and mixtures of two or more compounds which are volatile organic solvents for high acrylonitrile polymers having boiling points above the dissipation point of acetonitrile or acetonitrile-water solvent, that is, above about 75 to 100 degrees centigrade. As examples of such high boiling organic solvents, there may be mentioned cyclic-organic esters containing from 3 to 5 carbon atoms, such as cyclic ethylene carbonate, cyclic propylene carbonate, methylethylene carbonate, chloromethylethylene carbonate, ethylethylene carbonate, tetramethylene carbonate, gamma-butyrolactone, delta-valerolactone, and gamma-valerolactone; N-acetyl morpholine, cyclic tetramethylene sulfone, N,N-dimethyl formamide, ethylene sulfite, N,N-dimethyl hydroxyacetamide, N,N-dimethyl methoxyacetamide N-formyl hexamethylene imine, p-phenylene diamine, m- and p-nitrophenol, succinonitrile, glycolonitrile, succinic anhydride, diglycolic anhydride, N,N'-diformylpiperazine and mixtures thereof.

Of the above solvents, excellent melt spinnability is particularly achieved with the lactones, preferably gamma-butyrolactone, in combination with acetonitrile-water. The ternary plasticizer enables the attainment of spinning speeds higher than those possible with solution dopes at low solvent levels. The high boiling plasticizer in this aspect of the invention is an organic compound which at higher concentrations would dissolve acrylonitrile polymers of at least 85 percent acrylonitrile content and, although highly volatile at extrusion temperature, is not substantially dissipated prior thereto.

The plasticizer-solvent mixture will generally comprise about 15 to 50 weight percent of the total melt and, preferably, about 40 weight percent. With high polyacrylonitrile polymers, there should be about 60 weight percent polymer and about 40 weight percent solvent for optimal processing conditions to form a homogeneous melt for film and filament extrusion.

To illustrate a preferred composition of the present invention for use with a high polyacrylonitrile polymer, the plasticizing solvent, forming 40 weight percent of the total melt, would consist of 50 weight percent high boiling, volatile organic solvent, 42 weight percent acetonitrile and 8 weight percent water.

To form the homogeneous melt to be metered to the extruder, temperatures in excess of the boiling temperature of acetonitrile are used, particularly for the more difficulty soluble acrylonitrile polymers. Therefore, the melt blending process is operated under super-atmospheric pressure which can be an applied pressure or the vapor pressure of the acetonitrile and/or water developed autogeneously at the elevated temperature. The pressure use is preferably that required to maintain the solvent in primarily the liquid phase at the initial blending temperature. This pressure increases with temperature and is in an amount of about 30 to 40 pounds per square inch gauge at about 100 degrees centigrade. Thus, the initial blending step is preferably conducted in a pressure unit or sealed system to prevent the escape of the acetonitrile vapors and to maintain the acetonitrile in the liquid phase.

Having reached the blending temperature, which will vary with the proportions of acetonitrile, water and the particular acrylonitrile polymer within the range of about 80 up to about 160 degrees centigrade, the temperature of the composition can be reduced to the desired holding temperature, spinning temperature or molding temperature. The homogeneous composition gels on reducing to a temperature below about 80 degrees centigrade, again depending on the particular composition and proportions. Thus, the composition can be cooled and retained in a gelled state for storage or shipment and/or maintained in the temperature range of about 80 up to below the degradation temperature of the polymer. The present compositions are remarkably stable to prolonged heating. The high boiling plasticizer may be incorporated into the blend during or subsequent to the addition of the acetonitrile plasticizing fraction. In the later instance, high speed mixing is generally required to assure homogeneity and uniform, reproducible extrudates. The preformed polyacrylonitrile-acetonitrile fraction blend along with the high boiler is charged to a beater-type mixer for a period of about 20 to 40 minutes. Preferably and especially with the more difficultly soluble high acrylonitrile polymers, the mixing should occur at a slightly elevated temperature e.g., 75 to 85 degrees centigrade. Lower mixing temperatures and shorter times do not result in adequate homogeneity of ingredients for continuous, high speed melt extrusion. On the other hand, longer mixing cycles and higher temperatures tend to produce polymer degradation and discoloration in the extrudate. The melt is then fed under positive pressure by the metering pump to the extruder because of the viscous nature of the plasticized acrylonitrile. Depending upon number and cross-sectional orifice area, which should be to about .005 square inch for continuous, uniform extrusion, positive, pressures up to 12,000 to 15,000 pounds per square inch may be required. Normally applied extrusion pressures of the order of 175 to 1000 pounds per square inch are preferred and pressures as low as 50 pounds per square inch are adequate with larger cross-sectional film dies.

Extrusion temperatures will vary from the gelation temperature of the polymer up to its degradation point, about 230 degrees centigrade with polyacrylonitrile. Preferably, temperature in the die will be below 200 degrees centigrade, i.e. 75 to 200 degrees centigrade. At temperatures above about 200 to 210 degrees centigrade the likelihood of polymer degradation increases. On the other hand, with extrusion temperatures below about 75 degrees centigrade, the polymer begins to gel, clogging the extruder.

The present invention eliminates the problems existent in true melt extrusion of high acrylonitrile polymers by the provision of a binary plasticizing system comprising relatively low boiling and high boiling fractions. Polymer degradation is non-existant with the employment of the acetonitrile plasticizer which lowers the initial melting point of the acrylonitrile polymer sufficiently to permit homogeneous blending substantially below the polymer decomposition temperature while also reducing the percentage of higher boiling plasticizer required in the melt. The low concentration of high boiling plasticizer is particularly advantageous in eliminating the prior art necessity of post-extrusion washing steps. While prior art methods require at least 40 percent high boiling plasticizer necessitating post-extruder solvent removal, the melts of the present invention, containing on the average 20 percent, based on total melt weight of high boiler need not be washed. The amount of high boiler adhered to the extrudate dissipates during extrudate attenuation and, in fact it is only that concentration of high boiler necessary for maintenance of initial post-extruder apparent melt viscosity lower than $10^5$ poise, permitting adequate fluidity for good melt attenuation of at least 500 percent, which need be included in the plasticizing system.

The invention will be more fully described by reference to the following examples which illustrate certain preferred embodiments of the present invention. Unless otherwise indicated, all temperatures are in degrees centigrade and all parts are by weight in the examples and appended claims.

Example I

In accordance with the invention, 60 parts of an acrylonitrile copolymer containing about 88 percent acrylonitrile and about 12 percent methacrylate polymerized to an intrinsic viscosity of 1.4 was plasticized to form a homogeneous mixture for film extrusion by admixture in a beater-type mixer at 25 degrees centigrade with 40 parts of a plasticizer composed of 50 percent gamma-butyrolactone, 42 percent acetonitrile and 8 percent water. The melt is extruded through a conventional screw extruder having a 24 inch barrel terminating in a film die one inch by 0.020 inch under a positive pressure of about 75 pounds/square inch. With a die head temperature in the range of about 125 to 150 degrees a continuous, void free, transparent slightly yellowish film having an initial intrinsic apparent melt viscosity of 1.2 emerges from the die. Subsequent to extrusion, the film is continuously hot attenuated and drawn beyond 250 percent over a hot shoe at a takeup speed of 6.5 meters/minute. The temperatures in the three heating zones of the extruder between input and die are 80 degrees centigrade, 115 degrees centigrade and 140 degrees centigrade. The film has a tensile strength of 0.5 grams per denier.

Example II

Example I is repeated with a die head temperature in the range of about 175 to 200 degrees resulting in the extrusion of a continuous, slightly yellowish, foamed film having an initial intrinsic apparent melt viscosity of 1.2. The foaming effect apparent at the higher extrusion temperatures is due to vaporization of gamma-butyrolactone as the film emerges from the die. The film is taken up at a speed of 7 meters per minute following a 250 percent hot draw. The film has a tensile strength of .6 grams per denier and may be readily fibrillated.

Example III

Sixty-eight parts of the polymer of Example I admixed with 32 parts of gamma-butyrolactone is extruded through the extruder, used in Example I. All temperature zones in the extruder, including the die head, must be maintained at at least 190 degrees centigrade to prevent plugging. The extruded film contains many solid imbedded polymer particles and cannot be hot drawn over 200 percent.

Example IV

Sixty parts of the polymer of Example I admixed with 40 parts plasticizer consisting of 84 percent acetonitrile and 16 percent water is continuously fed to a screw extruder terminating in a ⅛ inch pellet die held at 80 degrees centigrade. The extrudate gels immediately upon emerging from the die lips forming a clear, spherical mass which cannot be hot drawn. When the melt temperature is raised to 100° C., a foamed monofilament is extruded which cannot be hot drawn into a coherent filament.

The products of Examples III and IV exhibit lower tensile strength and higher apparent melt viscosities than those required for good hot melt attenuation as described hereinbefore.

Example V

According to the procedure of Example I, acrylic filaments are extruded when a spinnerette having 12 circular holes 0.004 inch in diameter and 1/32 inch in thickness is substituted for the film die of Example I. Due to the small cross-sectional area, greater pressures are required.

The multi-filament yarn having an initial apparent melt viscosity within the range specified above is drawn over a hot shoe to form a tenacious yarn having excellent physical properties.

In a like manner, other high boiling plasticizers, such as dimethyl formamide, N-acetyl morpholine, delta-valerolactone, cyclic propylene carbonate and the like are substituted for the gamma-butyrolactone with correspondingly good results. Comparable results are achieved when homopolymers of acrylonitrile and other acrylic copolymers containing at least 85 percent by weight acrylonitrile copolymerized with one or more copolymerizable ethylenically unsaturated monomers are plasticized according to the present invention and extruded into acrylonitrile films and filaments. In particular, terpolymers and polymers containing a sulfur or phosphorous group in the ethylenically unsaturated material are used with correspondingly good results. If desired, conventional foaming or blowing agents may be included in the feed.

The films, where initially foamed, produced from the compositions of the present invention may be subjected to further fibrillation according to mechanical procedures known in the art. For instance, following void formation, the foamed extrudate may be oriented and fibrillated by passage through air jets or a tortuous path.

While there have been described various embodiments of the present invention, the methods and elements described herein are not intended to be understood as limiting the scope of the invention as it is realized that changes therein are possible. It is intended that each element of the invention is to be understood as referring to all equivalent elements for accomplishing substantially the same results in substantially the same or equivalent manner.

What is claimed is:
1. A process for forming shaped articles from high acrylonitrile polymers comprising:
   (a) blending a mixture of at least 50 weight percent high acrylonitrile polymer consisting essentially of at least about 85 weight percent acrylonitrile and up to about 15 percent of another ethylenically unsaturated compound copolymerizable with acrylonitrile with a plasticizing amount of a solvent system consisting essentially of from about 40 to 70 weight percent acetonitrile fraction and 60 to 30 weight percent compatible cyclic-organic ester containing from 3 to 5 carbon atoms, under heat and pressure, the plasticizing solvent system making up from about 15 to 50 weight percent of the mixture;
   (b) melting the mixture and extruding the melt through a shaped orifice at a temperature of between about 75 to 200° C. and under a pressure of about 50 to 15,000 pounds per square inch guage and
   (c) drawing down said extrudate at least 105 to 500 percent and taking up the acrylonitrile shaped article at a speed of at least 3 meters per minute.

2. The process of claim 1 wherein the melt is extruded at the vaporization temperature of the high boiling plasticizer.

3. The process of claim 1 wherein the cyclic-organic ester is gamma-butyrolactone.

References Cited
UNITED STATES PATENTS

| | | | |
|---|---|---|---|
| 2,695,835 | 11/1954 | Hare | 264—206 |
| 2,706,674 | 4/1955 | Rothrock | 264—206 |
| 2,713,041 | 7/1955 | Friedlander | 260—32.6 AO |
| 2,764,468 | 9/1956 | Hare | 264—182 |
| 2,764,469 | 9/1956 | Kowalik | 264—182 |
| 2,846,727 | 8/1958 | Bechtold | 264—182 |
| 2,862,903 | 12/1958 | Wooton | 260—29.6 AO |
| 2,879,242 | 3/1959 | Weinstock | 260—29.6 AO |
| 3,006,715 | 10/1961 | Lyman | 264—206 |
| 3,388,202 | 6/1968 | Opferkuch | 264—206 |
| 3,402,231 | 9/1968 | Bynum et al. | 264—210 |

JAY H. WOO, Primary Examiner

U.S. Cl. X.R.
264—182, 206